US011457404B2

(12) United States Patent
Kiessling et al.

(10) Patent No.: US 11,457,404 B2
(45) Date of Patent: Sep. 27, 2022

(54) METHOD FOR CONNECTING A USER TERMINAL TO A NETWORK SLICE

(71) Applicant: ORANGE, Issy-les-Moulineaux (FR)

(72) Inventors: Lars Kiessling, Chemnitz (DE); Bernard Massicot, Issy les Moulineaux (FR); Khadija Daoud Triki, Meudon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/307,753

(22) PCT Filed: Jun. 6, 2017

(86) PCT No.: PCT/FR2017/051420
§ 371 (c)(1),
(2) Date: Dec. 6, 2018

(87) PCT Pub. No.: WO2017/212162
PCT Pub. Date: Dec. 14, 2017

(65) Prior Publication Data
US 2019/0253962 A1  Aug. 15, 2019

(30) Foreign Application Priority Data

Jun. 7, 2016  (FR) ...................................... 1655213

(51) Int. Cl.
*H04W 4/00* (2018.01)
*H04W 48/20* (2009.01)
*H04W 48/18* (2009.01)
*H04W 76/10* (2018.01)
*H04W 84/04* (2009.01)

(52) U.S. Cl.
CPC ........... *H04W 48/20* (2013.01); *H04W 48/18* (2013.01); *H04W 76/10* (2018.02); *H04W 84/042* (2013.01)

(58) Field of Classification Search
CPC ..... H04W 48/20; H04W 48/18; H04W 76/10; H04W 84/042
USPC ......................................................... 370/329
See application file for complete search history.

(56) References Cited

U.S. PATENT DOCUMENTS

| | | | |
|---|---|---|---|
| 2011/0149968 A1* | 6/2011 | Kim ........................ | H04L 69/32 370/392 |
| 2018/0262979 A1* | 9/2018 | Wang .................... | H04W 48/18 |
| 2019/0014515 A1* | 1/2019 | Zee ....................... | H04W 48/18 |

(Continued)

OTHER PUBLICATIONS

International Search Report dated Oct. 12, 2017 for corresponding International Application No. PCT/FR2017/051420, filed Jun. 6, 2017.

(Continued)

*Primary Examiner* — Mang Hang Yeung
(74) *Attorney, Agent, or Firm* — David D. Brush; Westman, Champlin & Koehler, P.A.

(57) ABSTRACT

A method for connecting a user terminal to a subset of a network dedicated to a service, termed network slice, implemented by the terminal. This method includes at least one step of receiving at least one network slice identifier, originating from an access device associated with the at least one identified slice, a step of selecting a network slice as a function of parameters included in the terminal, and of the at least one slice identifier received. The method furthermore includes a step of attaching to the access device associated with the selected network slice.

18 Claims, 6 Drawing Sheets

(56) References Cited

U.S. PATENT DOCUMENTS

2019/0028941 A1* 1/2019 Zee ............... H04W 36/0066
2019/0037409 A1* 1/2019 Wang ............... H04W 28/06

OTHER PUBLICATIONS

Written Opinion of the International Searching Authority dated Oct. 12, 2017 for corresponding International Application No. PCT/FR2017/051420, filed Jun. 6, 2017.

Huawei et al, "UE Slice Association/Overload control Procedure", 3GPP Draft; S2-163161 3116 UE Slice Association Overload Control Procedure V3, 3rd Generation Partnership Project (3GPP), Mobile Competence Centre, 650, Route Des Lucioles, F-06921 Sophia-Antipolis, vol. SA WG2, no. Nanjing, China; May 23, 2016-May 27, 2016, May 27, 2016 (May 27, 2016), XP051116618.

Nokia et al., "Solutions for for Network Slice Selection", 3GPP Draft; R3-161356 Sliceselect, 3rd Generation Partnership Project (3GPP), Mobile Competence Centre; 650, Route Des Lucioles; F-06921 Sophia-Antipolis Cedex; France, vol. RAN WG3. no. Nanjing China; May 23, 2016-May 27, 2016, May 22, 2016 (May 22, 2016), XP051106154.

ZTE, "Network Slice Selection Procedure", 3GPP Draft; R3-161107 Network Slice Selection Procedure V4, 3rd Generation Partnership Project (3GPP), Mobile Competence Centre; 650, Route Des Lucioles; F-06921 Sophia-Antipolis Cedex; France, vol. RAN WG3, no. Nanjing, China; May 23, 2016-May 27, 2016, May 22, 2016 (May 22, 2016), XP051105915.

ZTE, "Clarification on Network Slicing in RAN", 3GPP Draft; R3-161106 Clarification on Network Slicing in RAN V4. 3rd Generation Partnership Project (3GPP), Mobile Competence Centre; 650, Route Des Lucioles; F-06921 Sophia-Antipolis Cedex; France, vol. RAN WG3, no. Nanjing, China; May 23, 2016-May 27, 2016, May 22, 2016 (May 22, 2016), XP051105914.

International Preliminary Report on Patentability and English translation Written Opinion of the International Searching Authority dated Dec. 11, 2018 for corresponding International Application No. PCT/FR2017/051420, filed Jun. 6, 2017.

"3rd Generation Partnership Project; Technical Specification Group Services and System Aspects; Study on Architecture for Next Generation System (Release 14)", 3GPP technical report TR 23.799 v0.2.0 of Feb. 2016.

* cited by examiner

METHOD FOR CONNECTING A USER TERMINAL TO A NETWORK SLICE

CROSS-REFERENCE TO RELATED APPLICATIONS

This Application is a Section 371 National Stage Application of International Application No. PCT/FR2017/051420, filed Jun. 6, 2017, which is incorporated by reference in its entirety and published as WO 2017/212162 A1 on Dec. 14, 2017, not in English.

1. Field of the Invention

The invention lies in the field of telecommunications networks.

2. Prior Art

The architecture of mobile telecommunications networks has hitherto been standardized via a standardization group known by the name 3GPP. Such is in particular the case for so-called "2G", "3G" and "4G" mobile networks, whose various architectures are defined in technical specifications established by such a body.

Until the "4G" generation of mobile network currently undergoing deployment, the various network architectures rely on very specific devices dedicated to certain precise functionalities, whether this be at the access network or the network core level, in particular as regards the transmission of packets from or to a mobile terminal.

The lack of flexibility and of upgradability inherent in this type of conventional architecture has led to envisaging the adoption of more flexible architectures for the next generation of mobile networks, termed "5G", so as to be able to respond rapidly to extremely diverse demands in terms of traffic or quality of service. It should be noted that 5G networks are intended to relate both to mobile networks and to fixed networks. Consequently, the techniques inherent in the development of 5G networks relate both to fixed and mobile infrastructures.

Among the solutions envisaged, one of the most promising solutions relies on a technique of cutting the network into slices ("network slicing"), which is mentioned in particular in the 3GPP technical report TR 23.799 v0.2.0 of February 2016.

The network slice concept is intended to support communications services for specific services, specific clients or specific terminals by applying traffic management means suited to these specific needs. A network slice is composed of network functions and of configurations making it possible to satisfy the requirements tied to the services to be satisfied by way of this network slice. The network slices deployed by an operator are not all composed of the same network functions knowing that the idea is to adapt the architecture and the network slices to suit the needs of the case of use tied to this network slice. By way of example, a network slice implemented in respect of services tied to IoT (Internet of Things) services might make it necessary to manage a large number of terminals but a rather low bitrate associated with each terminal if dealing for example with meter readings. A service offered to a professional clientele will require advanced security and availability functions. The objective is to activate for a given network slice only the functions which are indispensable for the case of use corresponding to the network slice and to not implement superfluous functions. The objective of this architecture in the form of network slices is to provide the operator with more flexibility and to offer clients services corresponding to their needs while activating only the necessary functions.

The notion of network slice is very often associated with virtualization techniques. In order to avoid deploying physical devices for each network slice, the operator can advantageously use virtualized functions to implement a network slice, thus making it possible to deploy a single physical infrastructure and to activate on this physical infrastructure several network slices. The operator will also be able to deploy physical devices for some functions and a virtualized architecture for other functions. Some functions, for example for scheduling in access networks, will be able to be pooled between the various network slices while some, for example for DPI (Deep Packet Inspection), will be used for a limited number of network slices.

Such a technique of network slicing thus allows the operator of a telecommunications network to create "tailored" networks, capable of providing optimized solutions for very varied scenarios with very diverse constraints in terms of functionality and performance.

Provision is made for a multitude of network slices to be able to be executed simultaneously within one and the same telecommunications network, so as to offer various services across this network.

In current techniques, network slices relate mainly to network cores, comprising in particular the MME (Mobility Management Entity), the SGW (Serving Gateway) and the PGW (PDN Gateway)). Thus, an operator has the possibility of dedicating network cores, for example for a virtual operator, for a specific category of clients or for a specific service. The separation of the resources is, however, not solely valid for network cores and it is may be envisaged to also dedicate the access resources, for example the eNodeBs, the NodeBs, the RNCs (Radio Network Controllers) as well as the future access nodes of the networks of the future generation (5G). The frequencies of radio access networks may themselves be dedicated. Thus, it is possible to completely dedicate a mobile network architecture including network core and access and to deploy a network slice comprising network core and access resources, for example to ensure that the processing of the streams associated with the case of use supported by the network slice makes it possible to satisfy the requirements of the case of use in question.

The selection of a network slice by the terminal is carried out by a device of the network core or else by a device of the access network in cooperation with a device of the network core. Whatever technique is used, this selection requires that the terminal connect beforehand to the access network or indeed to the network core so as to be allotted a network slice, including if no network slice is allotted to it, therefore using resources of the access network and network core in an inappropriate manner.

The object of the present invention is to remedy these drawbacks.

SUMMARY

The invention aims to improve the situation with a method for connecting a user terminal to a subset of a network dedicated to a service, termed network slice, implemented by the terminal and comprising:
  at least one step of receiving at least one network slice identifier, originating from an access device associated with the at least one identified slice;

a step of selecting a network slice as a function of parameters included in the terminal, and of the at least one slice identifier received;

a step of attaching to the access device associated with the network slice selected.

The development of architectures based on network slices, these slices being able to be specific to the network core and/or to the access network, require the terminal to select a network slice from among the available network slices. The network slices correspond to services in the broad sense. Indeed, the network slice may offer a service of M2M (Machine to Machine) type, a high-bitrate data access service or else be an infrastructure dedicated to the traffic of a professional clientele, or indeed to the traffic of a virtual mobile operator for example. The operator deploying an architecture structured as network slices can offer its services by associating a given traffic with a network slice. The method according to the invention advantageously makes it possible to inform the user terminal of the various slices accessible and to select the network slice prior to its actual attachment to an access device, thus making it possible to not use resources of the access network that subsequently turn out to be non-optimal. According to the techniques available today, the terminal must connect to the network before being informed of the network slices available and thereafter selecting one. According to these earlier techniques, the terminal must therefore attach to an access device or indeed also to a network core device which is not necessarily the one that will allow it to connect to the most suitable network slice. These techniques are poorly suited to a context where the operators seek to economize to the maximum on the resources of networks.

According to the invention, the terminal is informed of the network slices for example by messages broadcast at the radio level if dealing with a mobile attachment network or on the wired link (optical, copper . . . ) if the terminal is hooked up to a wired network. Once the identifiers of network slices have been received, the user terminal selects the network slice according to its own specific algorithm, on the basis of the information and of other parameters determined, such as for example slice identifiers which will be able to be ranked in order of priority. A terminal may for example receive several identifiers of network slices, and must therefore select one before attaching to an access device of this slice. If dealing with a terminal intended to use M2M services of a "lambda" operator, it can select the network slice whose identifier corresponds to the M2M services of an attachment network of the "lambda" operator on which the streams of the M2M sessions can be conveyed. If dealing with a smartphone that has taken out a subscription to professional services, for example in the case where the terminal forms part of a fleet of terminals of an enterprise, it selects the network slice dedicated to professional services. If dealing with a personal telephone, it selects the general-public network slice. An order of priority of connection to the network slices can be defined in the selection algorithm so that the terminal selects by priority the "professional" network slice if it receives for example identifiers relating to general-public and professional network slices. Once the network slice has been selected, the terminal can attach to an access device of this slice.

According to a particular characteristic, the connection method furthermore comprises a step of reception by the user terminal of at least one operator network identifier.

In addition to identifiers of network slices to which it is able to attach, the terminal may receive identifiers of operator networks which the terminal will be able to use to select an operator network in addition to the network slice dedicated to a service. The reception of an operator identifier in addition to a slice identifier makes it possible to implement an enriched connection method relying on the operator identifier and the slice identifier. The selection algorithm will be able to select firstly the operator and then the network slice or else the slice identifier and then the operator in the case where the service tied to the network slice is offered by diverse operators. This second option requires that the slice identifier be identified and recognized by the various operators implementing a network slice corresponding to this identifier. It might be opportune that the slice identifier, in particular in this case, be a standardized identifier.

A mobile terminal is informed of the attachment networks to which it can connect by identifiers of PLMN-id (Public Land Mobile Network Identifier) type which are broadcast by mobile access networks. This identifier which allows a mobile terminal to know the operator mobile networks that are accessible from the spot where it is situated, can advantageously be used in this invention as a selection parameter in respect of the mobile operator network supplementing the network slice selection method. In the case where the network slice identifier is not specific to an operator, it may be standardized, in accordance with what is defined for the PLMN-Id, in such a way as to facilitate the process of selection and determination at the level of the terminal in particular.

According to another particular characteristic, in the connection method, the at least one slice identifier is associated with the operator network identifier.

The slice identifier can advantageously be associated with the identifier on the operator network on which the network slice is implemented. In particular, in the network slice selection process, the item of information on the operator network may for example be included in the slice identifier, this representing an exemplary association between the identifiers, and may advantageously be exploited to select the network slice. It could thus be envisaged that only the slice item of information is broadcast to the terminals, and no longer the PLMN-Id, and that the syntax of the slice identifier suffices to select the operator network as well as the network slice. The item of information on the operator network can also be exploited if the identifier on the operator network, such as the PLMN-Id, is also received by the terminal. Indeed, the operator network item of information associated with the slice identifier makes it possible to correlate the network slice item of information and the operator network item of information. The terminal can therefore select a network slice implemented on an operator network identified by the operator network item of information associated with the slice identifier received. For example, the slice identifier may for example be structured according to the following schemes:

Scheme 1:

Information received structured in the following manner IdS1: PLMN1, IdS2: PLMN2 signifies that the service slice whose identifier is IdS1 is implemented on operator network 1 and that the network slice whose identifier is IdS2 is implemented on operator network 2.

Scheme 2:

Information received structured in the following manner PLMN1: IDS1, IdS2; PLMN2: IdS3 signifies that the operator network whose identifier is PLMN1 supports the network slices whose slice identifiers are IdS1 and IdS2 while the operator network whose identifier is PLMMN2 supports the network slice whose slice identifier is IdS3.

Other schemes for structuring the information between slice identifiers and operator network identifiers are possible for associating the two items of information, on the network slice and on the operator network.

According to another particular characteristic, in the connection method, the slice identifier is transmitted in the same message as the operator network identifier.

The operator network identifier and the network slice identifier may advantageously be transmitted in one and the same message in such a way that the terminal has these two identifiers at its disposal at the same moment to make the selection of the attachment network of an operator and of the network slice. In the case where the operator network identifier is of PLMN-Id type, the device in charge of the transmission of the PLMN-Id can insert the accessible network slice identifier into the message intended to inform the terminal about the PLMN-Id available. It should be noted that the device may in certain cases dispatch several slice identifiers. Within the framework of the deployment of fifth-generation networks, the specification of the access devices may advantageously integrate the capability for transmission of both items of information, namely the operator network identifier and the slice identifier. Furthermore, the simultaneous dispatching of the two identifiers allows a more flexible selection process making it possible in particular to select firstly an operator network and then a network slice or else the reverse and thus to permit selection options which are more open. Furthermore, the option to dispatch the two identifiers in the same message makes it possible to economize on resources, and this may be important in particular in a situation where the access networks are mobile networks. The messages used to transmit the identifiers relating to the operator networks and to the network slices can be dispatched according to a unicast, multicast or broadcast mode of transmission.

According to another particular characteristic, in the connection method, the slice identifier is transmitted in a message distinct from the message comprising the operator network identifier.

The two identifiers relating respectively to the operator network and to the network slice may advantageously be transmitted in two different messages. Indeed, initially the terminal may receive for example the operator network identifier and select the network by contrasting it with the identifiers stored on the terminal and thereafter receive the network slice identifier making it possible to select the network slice by contrasting said identifier with the network slice identifiers stored on the terminal. This option on the one hand makes it possible to be able to utilize different message formats and on the other hand to envisage that the two messages may be transmitted by different entities. Furthermore, with a view to deployment in existing networks, this option consisting in dispatching the two identifiers in two different messages is relevant, since it does not make it necessary to update an existing message format, nor to couple two processes for dispatching an identifier to the terminals.

According to another particular characteristic, the connection method furthermore comprises a step of selecting a network operator as a function of the at least one operator network identifier received.

The network identifiers received by the terminal can be used by the terminal to select an operator network in addition to the network slice. The reception of the two identifiers by the terminal can enrich the selection process and permit the selection of an operator network and then of a network slice or else of a network slice and then of an operator network as a function of the terminal's selection algorithm. For a service tied to a given network slice, it may be beneficial, in order for example to guarantee that a service is accessible whatever the operator, to select the network slice and then the operator network. In one embodiment, for an M2M service tied to health services, the network slice outweighs the choice of operator implementing an architecture dedicated to this slice. In another embodiment, in particular for a service for access to a professional clientele, the choice of the operator network might be favored in particular because the billing of the services tied to the network slice may be specific to a given operator.

According to another particular characteristic, the operator network comprising an access network and a network core, the slice identifier received by the terminal identifies entities of the network core.

Several options exist for structuring a communications network. Among them, it is possible to retain a pooled access network, stated otherwise one which is not structured as slices, which is used by the various terminals to transmit and receive the data. In this type of architecture, a network slice is composed only of network core entities such as the S-GW (Serving Gateway), PDN-GW (Packet Data Network Gateway), PCRF (Policy and Charging Rules Function), HSS (Home Subscriber Server) . . . if dealing with a mobile network. Each slice is associated with a specific traffic type, a specific clientele or specific services as a function of the network core operator's strategy. In this case, the network slice selection intervenes only for network core functions and does not apply to the access network which is pooled and on which the various streams of the users associated with the various network core slices will be conveyed. The identifiers of network slices and the network slice identifiers stored by the terminal relate in this case to entities of the network core.

According to another particular characteristic, the operator network comprises an access network and a network core, and the slice identifier received by the terminal identifies entities of the access network and entities of the network core.

Another option consists in composing network slices equally on the basis of network core entities and of access network entities such as the radio senders NodeB, eNodeB if dealing with a mobile network and in particular DSLAM, BRAS or BNG if dealing with a fixed network. This option makes it possible to specialize an end-to-end architecture for a specific clientele or service and thus to guarantee a certain degree of leaktightness with the other services or clientele according to the case. This type of architecture is in particular beneficial in the case where traffic requires suitable processing over the whole of the operator's communication chain. The identifiers implemented in this type of architecture identify network slices comprising network core entities and access entities. The network slice is dedicated to the segment of clientele or to the service, in accordance with the policy for defining and for structuring into slices which is implemented by the operator. The access infrastructure organized into slices can also comprise the radio frequencies, in which case the whole network architecture is organized into network slices dedicated to a service or a specific clientele. This typical case could be relevant in the case where an operator implements a specific network slice for emergency or security services, on which slice no other type of traffic can be conveyed. The operator thus guarantees that an end-to-end dedicated network is implemented for the service or the client in question.

According to another particular characteristic, the step of selecting the network slice of the connection method comprises a step of comparing the at least one slice identifier received with at least one network slice identifier stored in the terminal.

The selecting of the network slice by the terminal will advantageously be able to be done on the basis of a comparison between the slice identifiers received and network slice identifiers stored in the terminal. The network slice identifiers may be for example stored in an internal memory of the terminal. This option is of benefit when, for example, the provision of a terminal is included in a commercial offer of access to the network of an operator and the latter has the possibility of configuring the terminal or of recording data in the terminal, for example with a list of network slices to be selected according to an order of priority. The network slice identifiers will thus be able to be ranked according to a priority order, thus making it possible to select the first in the list from among the service identifiers received.

According to another particular characteristic, in the connection method, the at least one network slice identifier of the terminal is stored in the SIM card of the terminal.

The slice identifiers can advantageously be stored in the SIM card (Subscriber Identify Module) of the terminal. When the terminal receives the accessible identifiers of network slices, it compares them with the identifiers stored in the SIM card, and according for example to a prioritization of the identifiers as a function of the network slice to be favored, it performs the selection of the network slice. In the same manner, the identifiers will be able to be recorded on an eSIM card. This option is in particular beneficial in the case where the terminal selects an operator network and a network slice since the operator network selection algorithm relies on identifiers stored in the SIM card of the terminal.

According to another particular characteristic, in the connection method, a default network slice is selected if no slice identifier received by the terminal corresponds to a network slice identifier stored in the terminal.

The terminal may receive identifiers of attachment network slices not corresponding to any stored identifier. In this case, it is not possible to select a network slice by analyzing the network slice identifiers stored in the terminal, in an internal memory or on a SIM card. In order to be able to access a minimum set of services, the terminal can in this case select a default attachment network, for example according to a specific algorithm, allowing it to be able to communicate minimally. This particular embodiment allows in particular a terminal to be able to reach emergency services or to be able to access services when it is roaming for example and when none of the slices of the attachment networks from which it receives identifiers are present in the selection algorithm.

The various aspects of the connection method which have just been described can be implemented independently of one another or in combination with one another.

The invention also envisages a user terminal able to connect to a subset of a network dedicated to a service, termed network slice, comprising the following modules:

A reception module for receiving at least one network slice identifier, originating from an access device associated with the at least one identified slice;

A selection module for selecting a network slice as a function of parameters included in the terminal, and of the at least one slice identifier received;

An attachment module for attaching to the access device associated with the network slice selected.

The invention also envisages a system for connecting a user terminal to a subset of a network dedicated to a service, termed network slice, comprising:

At least one user terminal;

At least one access device associated with an operator network slice comprising a module for sending at least one network slice identifier.

The invention also relates to a computer program comprising instructions for the implementation of the steps of the connection method which has just been described, when this program is executed by the processor of a user terminal.

This program can use any programming language, and be in the form of source code, object code, or of code intermediate between source code and object code, such as in a partially compiled form, or in any other desirable form.

The invention also envisages an information medium readable by a computer, and comprising instructions of a computer program such as is mentioned hereinabove.

The information medium can be any entity or item or equipment capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium can be a transmissible medium such as an electrical or optical signal, which can be conveyed via an electrical or optical cable, by radio or by other means. The program according to the invention can in particular be downloaded over a network of Internet type.

Alternatively, the information medium can be an integrated circuit in which the program is incorporated, the circuit being suitable for executing or for being used in the execution of the methods in question.

BRIEF DESCRIPTION OF THE DRAWINGS

Other characteristics and advantages of the invention will become apparent on reading in the detailed description hereinafter particular embodiments given by way of non-limiting examples, and the appended figures in which.

DETAILED DESCRIPTION OF AT LEAST ONE EMBODIMENT OF THE INVENTION

Figure 1:
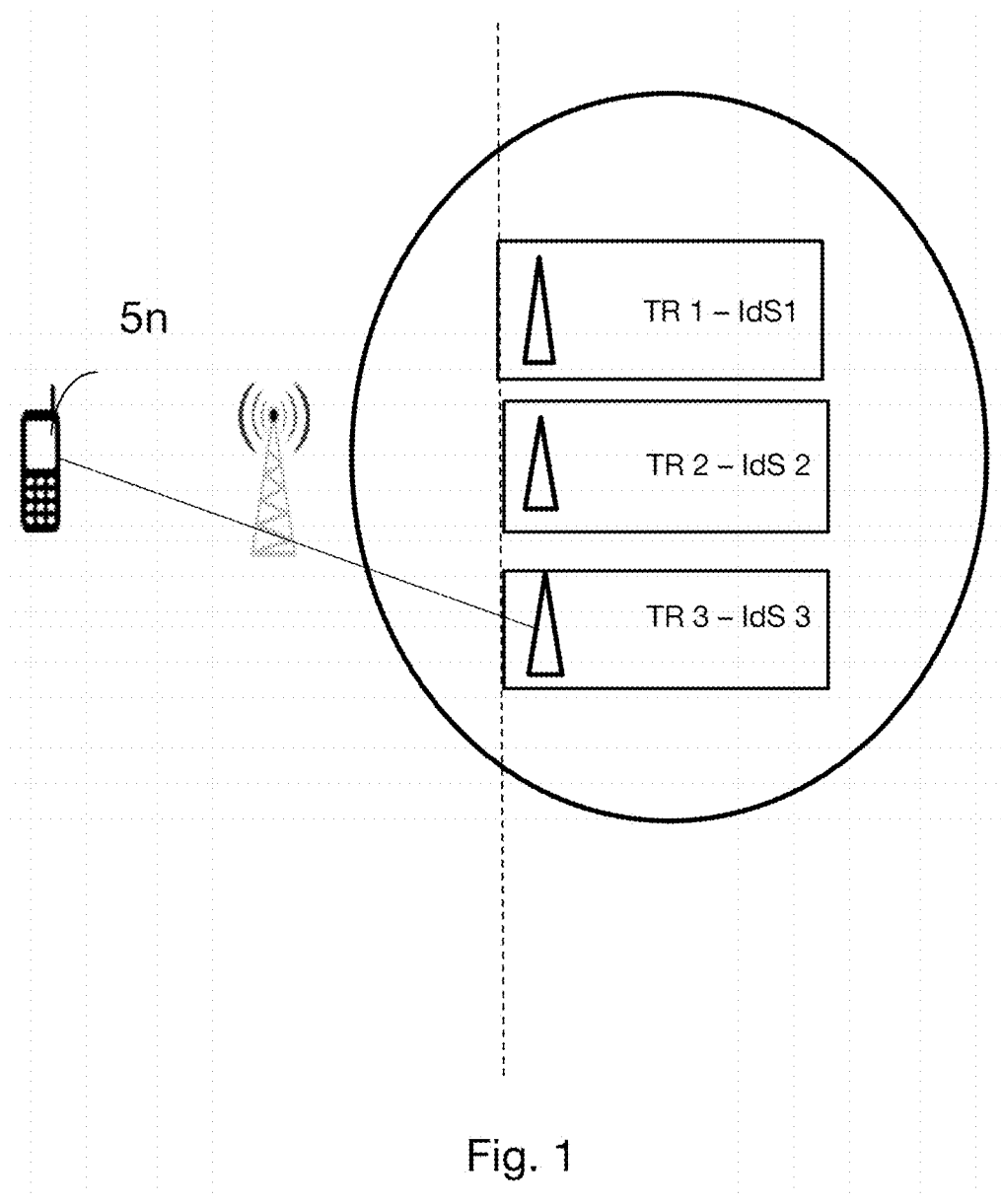
FIG. 1 illustrates in a schematic manner a system for connecting to a network slice involving a user terminal, according to the invention.

Reference is made firstly to FIG. 1 which illustrates in a schematic manner a system for connecting to a network slice involving a user terminal which connects to a slice of a network. An operator network is composed of 3 network slices TR1, TR2, TR3, these slices being able for example to be associated with distinct services. According to a particular embodiment, the network slice TR1 is implemented to convey the streams specific to M2M (Machine to Machine) services. The network slice TR2 is implemented to carry the traffic tied to the broadband services of a professional clientele while the network slice TR3 is implemented to convey the streams of a residential clientele. The operator can, as a function of its strategy, deploy as many network slices as necessary and assign these network slices to specific traffic flows, to specific clienteles or to specific market segments.

Each network slice respectively identified TR1, TR2, TR3 is able to send slice identifiers IdS1, IdS2, IdS3 destined for the terminals. These slice identifiers will be able in particular to be sent on radio frequencies if dealing with mobile networks or on the wired access link, for example the optical network or the copper network, if dealing with wired networks. The transmission of the slice identifiers and the reception of the latter by the terminals do not require the terminals to be connected to the attachment network; in particular it is not necessary for the terminals to have an IP address. If the terminals are on a wired network, they are connected physically to the network but it is not necessary for them furthermore to have a network connectivity to receive the slice identifiers. Thus in an identical manner to what is implemented in the network architectures to inform a mobile terminal about the various networks available at a given spot via the broadcasting of messages comprising the information of PLMN Id type, the terminals are also informed about the accessible network slices.

The terminal 5n attaches to the network slice TR3 since the slice identifier IdS3 transmitted by an access device of this slice and received by the terminal has been selected by the latter. For example, the terminal 5n is a residential-usage smartphone which attaches to the network slice intended to convey the streams of a residential clientele. The network slice is implemented by dedicating entities (for example within a network devices virtualization framework), devices or functions (naming, addressing . . . ) to a specific clientele or service. For example, the network slice TR3 can be composed of dedicated access devices, of specific users' management entities and of dedicated routing functions. Knowing that this is a matter of dedicating entities to various services, the operator can advantageously rely on the virtualization techniques to deploy architectures organized into network slices but this is not a matter of necessity. Physical devices are in this case deployed so as to be assigned specifically to the implementation of network slices.

Figure 2:
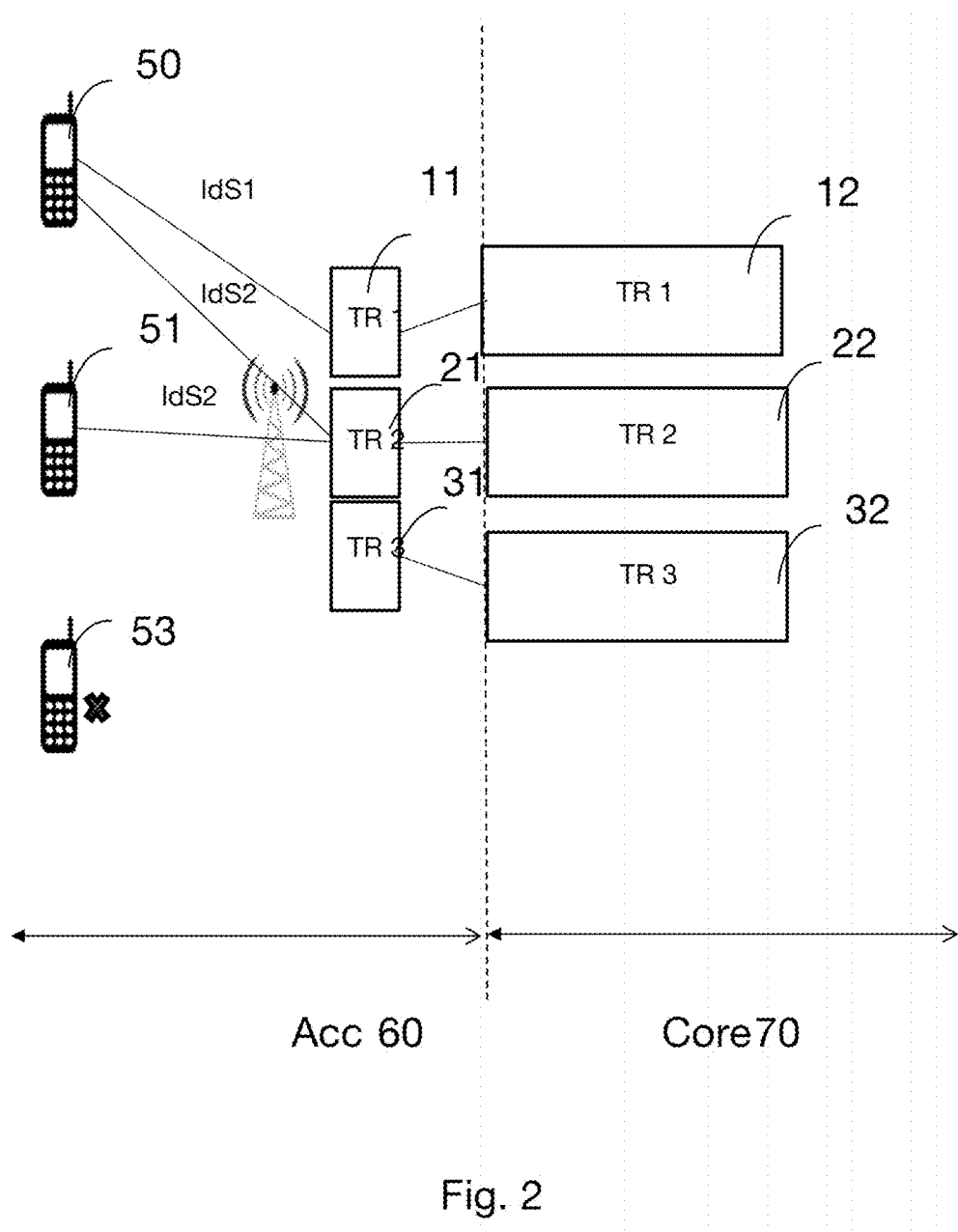
FIG. 2 illustrates a system where several terminals connect to network slices comprising access network entities and network core entities, according to one aspect of the invention.

Reference is now made to FIG. 2 which illustrates a system where several terminals have connected to network slices comprising at one and the same time access network entities 60 and network core entities 70. In this embodiment, three terminals 50, 51, 53 are able to attach to network slices TR1, TR2, TR3. The network slices in this embodiment comprise access network entities and network core entities. For example the network slice TR1 comprises access network entities 11 and network core entities 12 while the network slice TR2 comprises access entities 21 and core entities 22. The network slice TR3 comprises access entities 31 and core entities 32. If dealing with mobile infrastructure, the access network entities are for example the eNodeB, Node B, RNC (Radio Network Controller) while the network core entities are in particular the MME (Mobility Management Entity), the S-GW (Serving Gateway), the PDN-GW (Packet Data Network Gateway). The network slice may also integrate for example radio frequencies.

The terminal 50 is in this embodiment, once the method of the invention has been implemented, connected simultaneously to two distinct slices TR1 and TR2. The terminal 50 is for example endowed with capabilities for forwarding streams of M2M type, conveyed on the network slice TR1, and professional data streams, traveling on the network slice TR2. The terminal 50, receiving slice identifiers IdS1 and IdS2 from the respective access network entities 11 and 21, and having the capability to send and to receive streams associated with these network slices, connects to these two network slices. It is obvious that the terminal 50 must have the capabilities to route the respective streams associated with these network slices. It may also decide to connect to a single network slice although supporting the capability to connect to both slices, in particular as a function of its configuration. The terminal 50, according to the embodiment, can connect simultaneously to both slices whose service identifiers it receives or else be configured so as to attach to a single slice, even though it may subsequently attach to the other slice if necessary.

The terminal 51 is connected, once the connection method has been carried out, to a single network slice, in this instance the network slice TR2, either because it is configured to connect to a single network slice or because it has not received any other identifiers of network slices to which it might have connected. The terminal 53 is not connected to any network slice, either because it is configured to connect to no network slice corresponding to the slice identifiers that it has received, or because it is not within range of an access network transmitting a slice identifier.

The identifiers of network slices deployed by an operator can be of any type and be constructed on the basis of diverse alphanumeric codes. For example, an operator may decide that the identifier of a network slice intended to route the M2M traffic is M2M. Likewise, it may decide that the identifier of a slice intended to route the traffic of a virtual operator is for example OpeA. Whatever alphanumeric code is adopted, the terminal must be able to interpret it in order to select the network slice. The operator has furthermore the possibility of implementing a network architecture or an access device of a network slice which transmits several slice identifiers. The entities of the access network and of the network core are in this case deployed to carry the traffic of several network slices implemented by an operator. For example it could be envisaged that an operator dedicates network entities for professional and residential broadband services.

Figure 3:
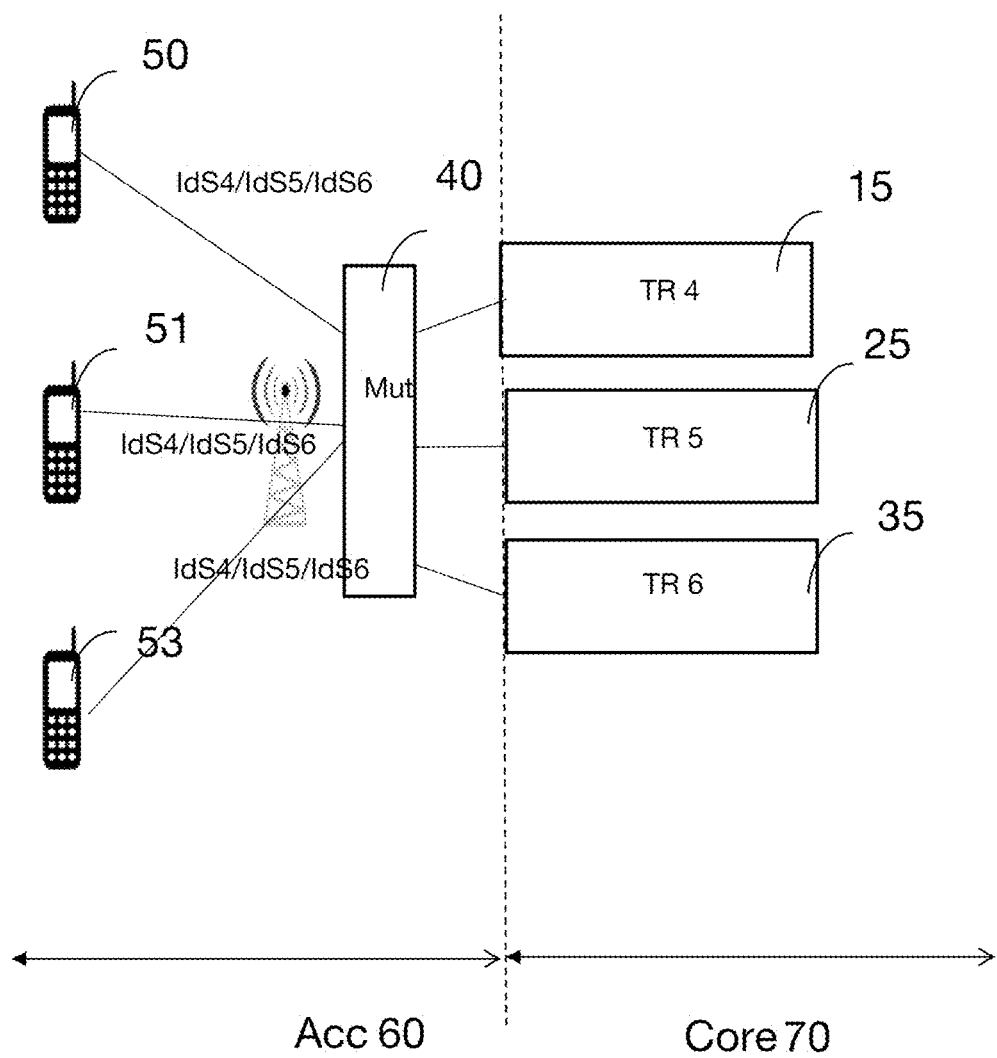
FIG. 3 illustrates a system where several terminals connect to network slices comprising solely network core entities, according to one aspect of the invention.

Reference is now made to FIG. 3 which illustrates a system where several terminals connect to network slices comprising solely network core entities. The difference with FIG. 2 described previously resides in the fact that the network slices implemented by the operator comprise only network core entities 70. The network slices TR4, TR5 and TR6 comprise respectively network core entities 15, 25 and 35. In this embodiment the entities 40 of the access network 60 are not differentiated by network slice and are therefore common in the sense that no entity of the access network is associated with a particular network slice. This embodiment does not signify that entities of the access network are not duplicated in particular to ensure availability of the services but these entities, even replicated, are not dedicated to network slices specially for conveying specific data streams.

The access network 60 is therefore not structured into network slices and represents a common access infrastructure for conveying the various streams exchanged between the terminals and the network slices implemented in the network core 70. Knowing that the network slices are not implemented in the access network, the dispatching of the slice identifiers to the terminals is not specific to a network slice and it is necessary that a device of the access network dispatches in an undifferentiated manner the identifiers of those network slices of the network core for which it ensures access. The terminals 50, 51 and 53 therefore receive in an undifferentiated manner the identifiers of network slices TR4, TR5 and TR6. As a function of the algorithm for selection of the terminals receiving these slice identifiers, these terminals will select the network slice or slices from among those corresponding to the slice identifiers received. The entities 40 of the access network 60 must therefore send the identifiers of network slices of the network core to all the terminals unless a specific policy has been configured for example to dispatch one or more specific identifiers of network slices.

The terminals are forthwith informed in the mobile architectures of the operator networks to which they can connect. The corresponding PLMN-Id information is transmitted by RRC (Radio Resource Control) messages from the eNodeB nodes of the LTE (Long Term Evolution) network to the terminal. The accessible identifiers of network slices, to be transmitted to the terminals, will advantageously be able to be also transmitted in the RRC messages when dealing with mobile networks. The terminal's network slice selection algorithm can be enriched by combining the slice identifier received in addition to the operator network identifier, for example based on the PLMN-Id, received. Thus it may be envisaged to force the selection of a network slice of an operator in particular or else a service in particular, or indeed any network slice of an operator. Such an algorithm could for example be structured in the following manner:

Orange.B2B
Orange.MassMarket
*.M2M

This algorithm signifies that for B2B (Business-to-Business) services, the B2B network slice of the Orange network must be selected. If a terminal receives a PLMN Id equal to Orange and a slice identifier equal to B2B, it will then select Orange.B2B. For residential services, the "residential" network slice of the Orange operator must be selected. Finally, for M2M services, a network slice supporting M2M services which is proposed by any operator can be selected. If the item of information Orange.*is added, this could consist in permitting the selection of any network slice supported by the Orange operator for example in case access is necessary for emergency services.

Figure 4:
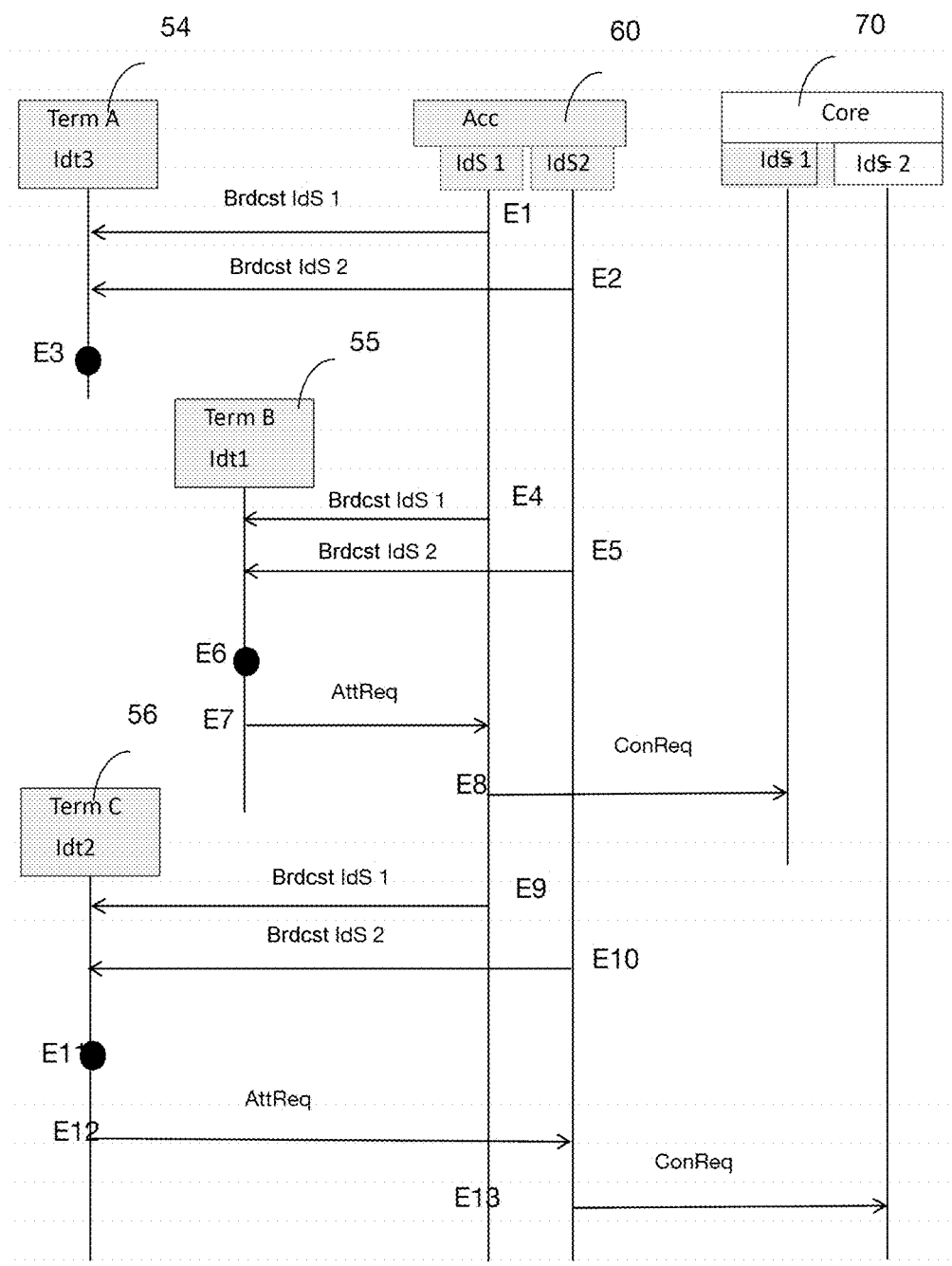
FIG. 4 illustrates the various steps of the connection method according to one embodiment of the invention where a network slice comprises access network entities and network core entities.

Reference is now made to FIG. 4 which illustrates the various steps of the connection method according to one embodiment of the invention where a network slice comprises access network entities and network core entities. In this embodiment, the terminal 54 is configured with a slice identifier equal to 3, signifying that this terminal 54 can connect only to a network slice corresponding to the slice identifier Idt3. This slice identifier can be configured directly in the terminal for example in a configuration file pre-installed by the operator with which the user has subscribed to a service or else on a SIM card installed in the terminal. The terminal 54 is within range of a mobile access network if dealing with a mobile network or else is attached via an xDSL or optical access for example if dealing with a wired access network. In this embodiment, the network slices implemented by the operator comprise access network entities 60 and network core entities 70. Two network slices are respectively identified by slice identifiers equal to 1 and 2 (IdS1 and IdS2). During a step E1, an entity of the access network of the network slice whose slice identifier is IdS1 transmits a message to the terminal 54 indicating that a network slice IdS1 is accessible. In the same manner, an entity of the access network of the network slice IdS2 transmits a message to the terminal 54 during step E2 indicating that a network slice IdS2 is accessible.

The messages indicating the accessibility of the network slices can be transmitted by virtue of messages of unicast type, intended solely for a terminal, or else of broadcast or multicast type in such a way that a single message is transmitted for a set of terminals. It is more probable that these messages are of multicast or broadcast type since the terminal is not directly reachable through the network. It is indeed not connected and therefore does not have an IP address allocated by the network. Nonetheless, it is possible to envisage for example that the terminal, endowed with an address of IPv6 link-local type, can be reached directly by a device of the network whilst the terminal has not had a global IPv6 network prefix allocated by the access network. The terminal 54, on receipt of the messages sent during steps E1 and E2, compares the slice identifier numbers received with the slice identifier number configured and selects during a step E3, if possible, one or more network slices with the aim of attaching thereto. In the present case, the slice identifier configured on the terminal is IdT3 whereas it receives slice identifiers IdS1 and IdS2. The algorithm of the terminal 54, in this embodiment, being to select the network slice(s) whose slice identifier number stored on the terminal is (are) equal to the slice identifier number(s) received, it does not select any network slice and does not connect to any network slice. It could be envisaged that in this typical case, the terminal 54 selects a default network slice, for example that having the smallest slice identifier number, so as to be able despite everything to access certain services, for example security services. The behavior of the terminal appertains to the algorithm implemented. The terminal 54, in this embodiment, does not connect to any slice since it has not received any message comprising the slice identifier IdS3.

The terminal 55 is configured with the slice identifier equal to Idt1. In the same manner as for the terminal 54, during the respective steps E4 and E5, the terminal 55 receives messages comprising the slice identifiers IdS1 and IdS2. During a step E6, the terminal 55 compares the slice identifiers received and the slice identifier configured. As a slice identifier number configured on the terminal corresponds to a slice identifier number received, the terminal 55 selects in this instance the slice identifier IdS1. During step E7, the terminal 55 dispatches an attachment request destined for the network slice of the access network corresponding to the slice identifier IdS1. The information enabling the terminal to attach to the selected network slice, such as the IP address of the access entity or its FQDN (Fully Qualified Domain Name) name, can advantageously be dispatched in the message comprising the network slice identifier, or else be configured in the device for example by associating the configured slice identifier with the information necessary for the attachment procedure. Knowing that the attachment requires an invoking of resources of the network core, the attachment request carried out during step E7 is followed by a connection request during step E8 transmitted by an access device of the slice to a core device of the selected slice. If dealing with a mobile network, this step E8 will be able to consist of a PDP (Packet Data Protocol) context or EPS (Evolved Packet System) bearer request instantiated during steps E7 and E8 and making it possible to establish the connection between the terminal and the PDN-GW of the network slice IdS1. If dealing with an xDSL network, these steps E7 and E8 correspond to the connection between the terminal and the DSLAM (Digital Subscriber Line Access Multiplexer) and then the BAS (Broadband Access Server) or the BNG (Broadband Network Gateway) via the PPP (Point to Point Protocol) or DHCP (Dynamic Host Configuration Protocol) protocol.

In the same manner as for the terminals 54 and 55, the terminal 56 receives slice identifiers IdS1 and IdS2 during the respective steps E9 and E10. The terminal 56 having a stored slice identifier IdT2 selects the network slice whose parameter is IdS2 during step E11 and attaches to the access entities of the network slice corresponding to the slice identifier IdS2 during step E12 and then to the core entities of this same network slice during step E13 via the connection request transmitted from an access device to a network core device of the slice considered.

Figure 5:
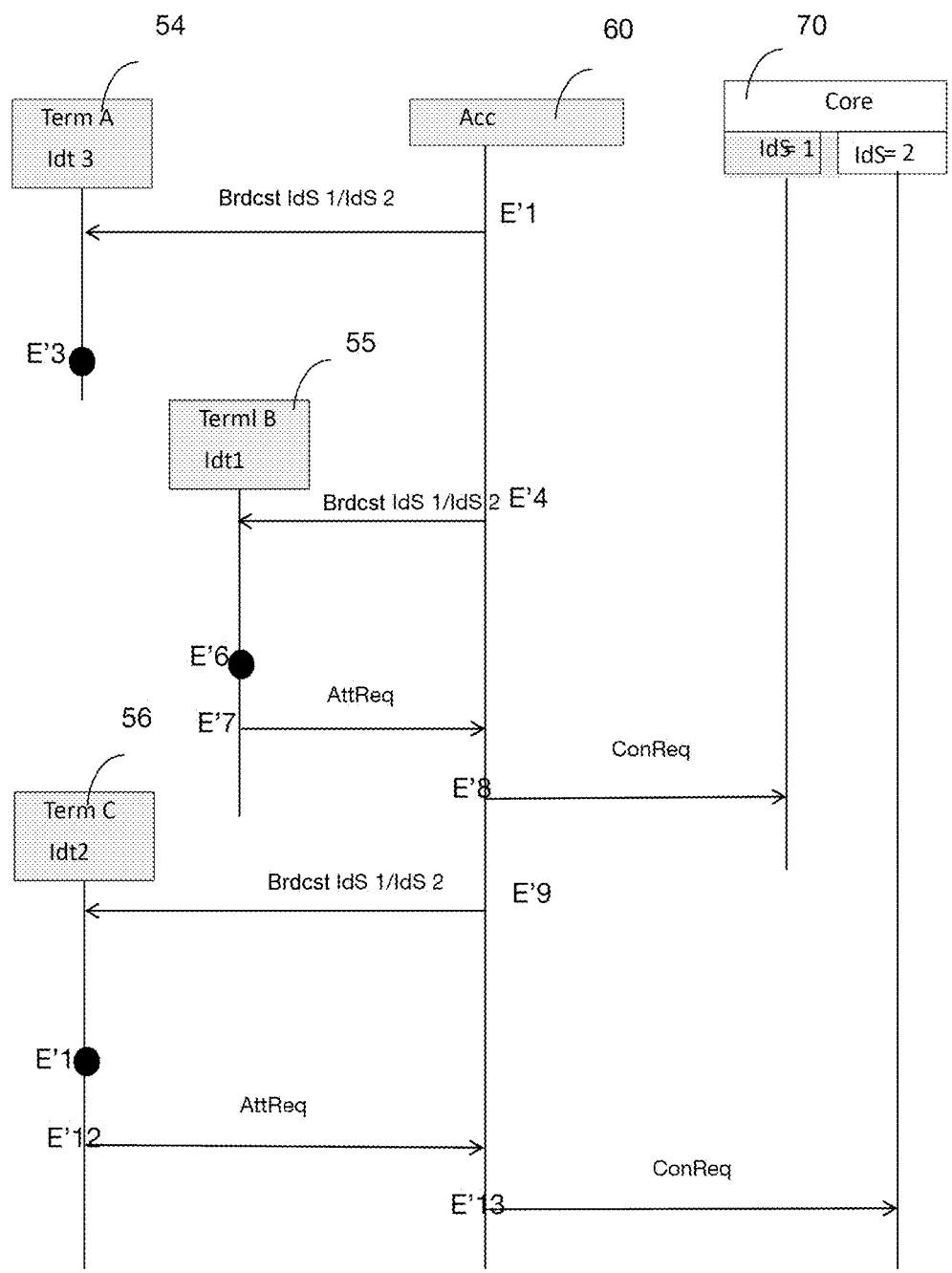
FIG. 5 illustrates the various steps of the connection method according to another embodiment of the invention where a network slice comprises solely network core entities.

Reference is now made to FIG. 5 which illustrates the various steps of the connection method according to another embodiment of the invention where a network slice comprises solely network core entities. The architecture presented in FIG. 5 differs from the architecture of FIG. 4 through the fact that the network slices implemented by the operator comprise only entities of the network core whilst the access network is not organized into network slices. The entities of the access network are therefore common to the various terminals and services. The access network not being structured into network slices, the slice identifiers are dispatched by a device of the common access network. This device of the common access network transmits to the terminals all of the identifiers of network slices to which the terminals are able to connect.

The network core 70 being structured into two network slices whose slice identifiers are IdS1 and IdS2, the entity of the access network must dispatch to the terminals all of the slice identifiers corresponding to the slices deployed in the network core. In step E'1, a device of the access network 60 transmits a message comprising the slice identifiers IdS1 and IdS2 to the terminal 54, the message being able to be transmitted according to a unicast, multicast or broadcast mode. Step E'3 is in every respect comparable to step E3 of FIG. 4, the aim for the terminal 54 being to compare the slice identifiers received with the slice identifiers configured on the terminal and to select one or more of them. The terminal 54 having a slice identifier number which does not correspond to any slice identifier number received during step E'1, the terminal 54 does not select any network slice and therefore does not make any attachment request. The following steps are in all respects equivalent to the steps described in FIG. 4, the only differences corresponding to the slice identifiers dispatched in the messages of steps E'4 and E'9, in a comparable manner to what was described for step E'1. It should also be noted that the access network not being structured into network slices, the access network must have a means of transmitting the connection requests of steps E'8 and E'13 to the network slices selected by the terminals 55 and 56. In a particular embodiment, the access network will be able to rely on a slice identifier included in the attachment requests sent during the respective steps E'7 and E'12 in order to dispatch the connection requests to the network slices selected by the respective terminals.

Figure 6:
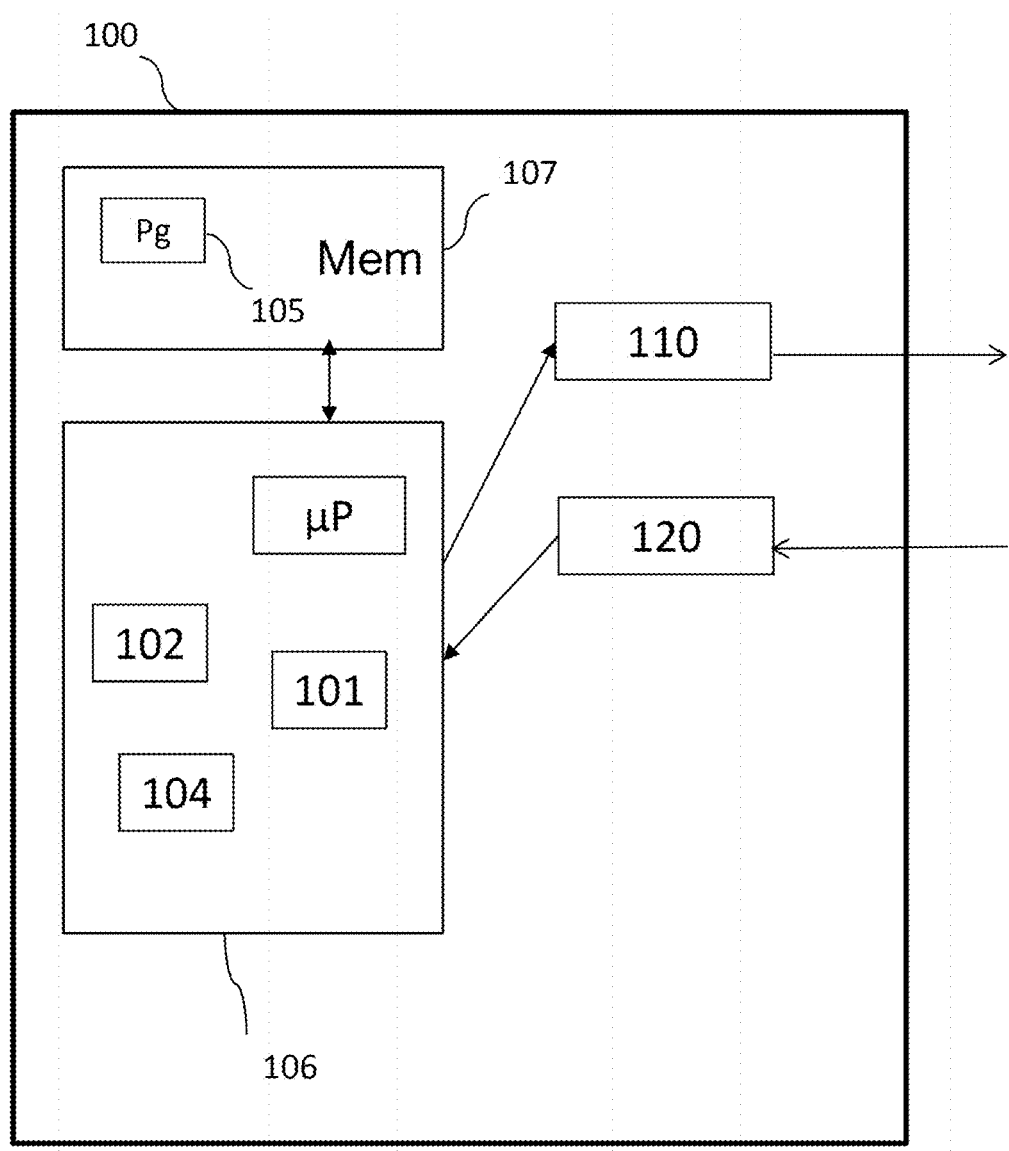
FIG. 6 illustrates the structure of a user terminal implementing the various steps of the connection method according to one realization aspect.

Reference is now made to FIG. 6 which illustrates the functions of a user terminal designed to accomplish the various steps of the connection method according to a particular embodiment.

For example, the terminal 100 comprises a processing unit 106, equipped for example with a microprocessor µP, and driven by a computer program 105, stored in a memory 107 and implementing the connection method according to the invention. On initialization, the code instructions of the computer program 105 are for example loaded into a RAM memory, before being executed by the processor of the processing unit 106. The terminal comprises an interface 110 for sending messages and an interface 120 for receiving messages.

The processing unit 106 furthermore comprises the following modules:
- a module 101 able to process a message comprising a network slice identifier received from an access device associated with the at least one identified network slice
- a selection module 104 for selecting a network slice as a function of parameters included in the terminal, and of the at least one slice identifier received;
- an attachment module 102 for attaching to the access device associated with the network slice selected.

The modules described in conjunction with FIG. 6 may be hardware modules or software modules.

The invention is not limited to the exemplary embodiments hereinabove described and represented, on the basis of which it will be possible to envisage other embodiments and other modes of realization, without however departing from the scope of the invention. The connection method, according to the invention, turns out to be particularly useful in a multi-operator context where the terminal can be informed of slices of networks associated with services even before connecting to one of the operator networks. Indeed, in order to connect to an operator network, it is generally necessary to take out a subscription to one or more services offered by this operator and it is not optimal to receive the slice identifiers once connected to the network. The invention makes it possible to dispatch these identifiers even before the terminal is connected to one of the operator networks broadcasting these slice identifiers. This enables a terminal to be able if relevant to subscribe to a service associated with a network slice proposed by the operator, once the slice identifier has been received.

The invention claimed is:

1. A connection method comprising:
    connecting a user terminal to a subset of a network dedicated to a service, termed a network slice, implemented by the user terminal prior to the user terminal's actual attachment to an access device of a plurality of access devices, by:
    at least one act of receiving at least one message comprising a service identifier, originating from a first access device of the plurality of access devices, which is associated with a network slice corresponding to the received at least one service identifier, the at least one message also comprising an IP address of the first access device;
    an act of selecting a network slice, comprising:
       comparing the received at least one service identifier with at least one network slice identifier stored in the user terminal; and
       in response to determining that no service identifier received by the user terminal corresponds to a network slice identifier stored in the user terminal, selecting a default network slice; and following the act of selecting the network slice, an act of attaching to a second access device of the plurality of access devices that is associated with the selected default network slice.

2. The connection method as claimed in claim 1 where the at least one service identifier is associated with an operator network identifier.

3. The connection method as claimed in claim 1 where the service identifier is received in a same message as an operator network identifier.

4. The connection method as claimed in claim 1 in which the received at least one message comprising the service identifier is distinct from a message comprising an operator network identifier.

5. The connection method as claimed in claim 1, wherein the network comprises an access network and a network core and the service identifier identifies entities of the network core.

6. The connection method as claimed in claim 1, wherein the network comprises an access network and a network core and the service identifier identifies entities of the access network and entities of the network core.

7. The connection method as claimed in claim 1, in which the at least one network slice identifier stored in the user terminal is stored in a SIM card of the user terminal.

8. The connection method as claimed in claim 1, wherein the at least one service identifier has a syntax that identifies at least one network operator.

9. The connection method as claimed in claim 1, wherein the received at least one message comprising the at least one service identifier comprises information enabling the user terminal to attach to the second access device associated with the at least one network slice identifier.

10. A user terminal wherein the user terminal comprises:
a processor; and
a non-transitory computer-readable medium comprising instructions stored thereon, which when executed by the processor configure the user terminal to perform acts comprising:
connecting to a subset of a network dedicated to a service, termed a network slice, prior to the user terminal's actual attachment to an access device of a plurality of access devices, by:
receiving at least one message comprising a service identifier, originating from a first access device of the plurality of access devices, which is associated with a network slice corresponding to the received at least one service identifier, the at least one message also comprising an IP address of the first access device;
selecting a network slice, comprising:
comparing the received at least one service identifier with at least one network slice identifier stored in the user terminal; and
in response to determining that no service identifier received by the user terminal corresponds to a network slice identifier stored in the user terminal, selecting a default network slice; and
following the act of selecting the network slice, attaching to a second access device of the plurality of access devices that is associated with the selected network slice.

11. The user terminal as claimed in claim 10, wherein the at least one service identifier has a syntax that identifies at least one network operator.

12. The user terminal as claimed in claim 10, wherein the received at least one message comprising the at least one service identifier comprises information enabling the user terminal to attach to the second access device associated with the at least one network slice identifier.

13. A system comprising:
a plurality of access devices; and
at least one user terminal, which comprises:
a processor; and
a non-transitory computer-readable medium comprising instructions stored thereon, which when executed by the processor configure the user terminal to perform acts comprising:
connecting to a subset of a network dedicated to a service, termed a network slice, prior to the user terminal's actual attachment to an access device of the plurality of access devices, by:
receiving at least one message comprising a service identifier, originating from a first access device of the plurality of access device, which is associated with a network slice corresponding to the received at least one service identifier, the at least one message also comprising an IP address of the first access device;
selecting a network slice, comprising:
comparing the received at least one service identifier with at least one network slice identifier stored in the user terminal; and
in response to determining that no service identifier received by the user terminal corresponds to a network slice identifier stored in the user terminal, selecting a default network slice; and
following the act of selecting the network slice, attaching to a second access device of the plurality of access devices that is associated with the selected network slice.

14. The system as claimed in claim 13, wherein the at least one network service identifier has a syntax that identifies at least one network operator.

15. The system as claimed in claim 13, wherein the received at least one message comprising the at least one service identifier comprises information enabling the user terminal to attach to the second access device associated with the at least one network slice identifier.

16. A non-transitory computer-readable recording medium on which the code instructions of a computer program are stored, which when executed by a processor of a user terminal configure the user terminal to perform a connection method, wherein the method comprises:
connecting to a subset of a network dedicated to a service, termed a network slice, prior to the user terminal's actual attachment to an access device of a plurality of access devices, by:
receiving at least one message comprising a service identifier, originating from a first access device of the plurality of access devices, which is associated with a network slice corresponding to the received at least one service identifier, the at least one message also comprising an IP address of the first access device;
selecting a network slice, comprising:
comparing the received at least one service identifier with at least one network slice identifier stored in the user terminal; and
in response to determining that no service identifier received by the user terminal corresponds to a network slice identifier stored in the user terminal, selecting a default network slice; and
following the act of selecting the network slice, attaching to a second access device of the plurality of access devices that is associated with the selected network slice.

17. The non-transitory computer-readable recording medium as claimed in claim 16, wherein the at least one service identifier has a syntax that identifies at least one network operator.

18. The non-transitory computer-readable recording medium as claimed in claim 16, wherein the received at least one message comprising the at least one service identifier comprises information enabling the user terminal to attach to the second access device associated with the at least one network slice identifier.

\* \* \* \* \*